United States Patent [19]

Smith

[11] 4,305,593
[45] Dec. 15, 1981

[54] SEAL

[75] Inventor: Robert L. Smith, Louisville, Ky.

[73] Assignee: Chemetron Process Equipment, Inc., Jeffersontown, Ky.

[21] Appl. No.: 144,080

[22] Filed: Apr. 28, 1980

[51] Int. Cl.³ .................... F16J 15/38; F16J 15/46
[52] U.S. Cl. .................................... 277/59; 277/65; 277/27; 277/72 R; 277/74; 277/2
[58] Field of Search ............. 277/59, 65, 3, 27, 81 R, 277/83, 87, 93 R, 93 SD, 95, 71, 72 R, 72 FM, 74, 173, 176, 177, 2

[56] References Cited

U.S. PATENT DOCUMENTS

| 2,614,793 | 10/1952 | Storm | 277/177 X |
|---|---|---|---|
| 3,144,035 | 8/1964 | Hablanian et al. | 277/59 X |
| 3,181,873 | 5/1965 | Reed | 277/59 X |
| 3,591,188 | 7/1971 | Eisner | 277/65 X |
| 3,662,894 | 5/1972 | Bockler | |
| 4,013,297 | 3/1977 | Smith | 277/3 |
| 4,101,139 | 7/1978 | Nordin | 277/65 X |
| 4,256,314 | 3/1981 | Berglund et al. | 277/27 |

FOREIGN PATENT DOCUMENTS 1330063  5/1963  France ................................. 277/74

Primary Examiner—Robert S. Ward, Jr.
Attorney, Agent, or Firm—John K. Williamson

[57] ABSTRACT

A shaft seal assembly with open mode capabilities has markedly simplified construction. A shiftable ring on the shaft is axially biased against a complemental, stationary shoulder circumscribing the shaft to form a pair of radially spaced annular seals concentric to the shaft. A fluid pressure port on the shoulder intermediate the seals permits selective shifting of the ring away from the shoulder to open the annular seals and place the seal assembly in the open mode wherein the shaft may be rotated without wearing the seals. In preferred forms, the seal assembly is provided with a vent between it and the shaft bearing to relieve pressure against the bearing when the seal assembly is shifted to the open mode, and also to serve as a leak indicator.

5 Claims, 2 Drawing Figures

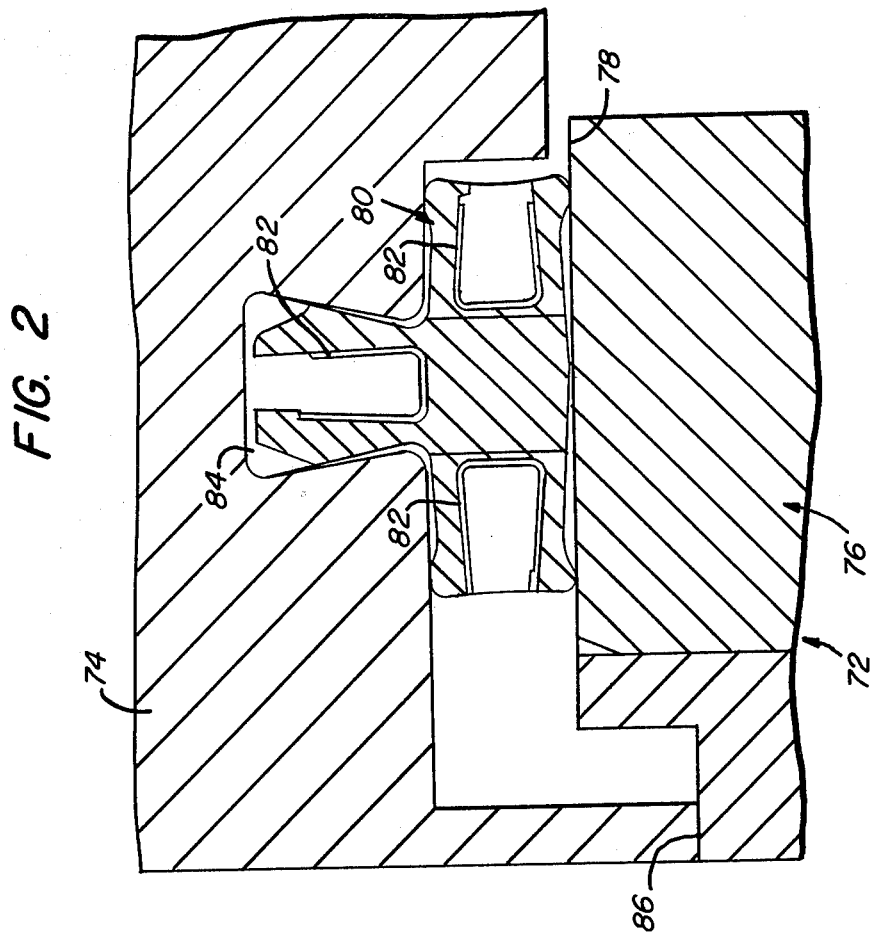

SEAL

TECHNICAL FIELD

This invention relates to fluid seals in general, and is particularly concerned with improvements in a static seal for an intermittently rotatable shaft wherein the seal is provided with structure to permit opening of the seal when it is desired to rotate the shaft.

BACKGROUND ART

Various types of processing equipment have tanks provided with an intermittently rotatable, element-supporting shaft. For example, the centrifugal filter disclosed in U.S. Pat. No. 3,662,894 has a filter-supporting shaft which is rotated only when the filters are cleaned.

In equipment of this construction, it is desirable to provide a seal between the shaft and the tank wall to prevent leakage from the tank. However, such seals may be subject to extreme wear, particularly when corrosive or abrasive material is processed.

One attempt to increase the service life of seals in the type of equipment described above, is disclosed in U.S. Pat. No. 4,013,297. There, a conventional static seal is established between the shaft and tank during such times as the shaft remains at rest; however, when it is desired to rotate the shaft, the seals are released by fluid under pressure to an open mode such that surface-to-surface wear of the seal is eliminated. While the seal of this reference has proved successful in greatly reducing seal wear in certain types of processing equipment, problems have developed with its use. The seal is expensive to fabricate and install due to the relatively large number of parts associated with the seal, and similarly, removal and replacement of the shaft is much more tedious than in equipment employing conventional seals. Moreover, in order to avoid injecting pressurized fluid into the shaft bearing, a separate high pressure seal must be provided.

SUMMARY OF THE INVENTION

The problems associated with prior open mode static seals have been overcome in the present invention. The unique construction of the invention described herein uses only about one-half the number of parts required for the seal disclosed in the 4,013,297 patent, and the new seal permits assembly and disassembly of the shaft and the tank with very little difficulty.

The seal assembly of the present invention includes a sleeve mounted on the tank, concentrically disposed around a segment of the outwardly projecting portion of the rotatable shaft. The sleeve has an inner shoulder which complementally engages a ring shiftably mounted on the shaft. The shiftable ring is biased against the shoulder and carries a pair of concentric, radially offset O-rings for forming spaced annular seals between the shoulder and the ring when the latter are biased together, as, for example, by the action of a spring washer.

An inlet adapted to be coupled to a source of fluid under pressure has a port opening in the shoulder intermediate the O-rings on the shiftable ring to permit selective shifting of the latter against the biasing of the spring washer whereby the seals between the ring and the shoulder are temporarily opened.

The shaft may be rotated while the seals are open, thereby eliminating any surface-to-surface wear between the elements of the seal. The seals may then be re-established by simply terminating the communication between the inlet and the source of fluid under pressure such that the shiftable ring returns, under the influence of the biasing washer, to its position seated against the shoulder.

In preferred forms, there is provided a vent between the bearing assembly of the shaft and the adjacent seal assembly. Thus, when the seals of this seal assembly are opened by the action of fluid from the pressure source, the vent will serve to relieve excess pressure against the lip seals of the bearing assembly. Additionally, the vent serves as an indicator should be primary seals of the seal assembly become worn sufficiently to permit leakage from the tank.

BRIEF DESCRIPTION OF THE DRAWING

FIG. 2 is a fragmentary, cross-sectional view showing an alternate embodiment of the seals for the seal assembly.

DETAILED DESCRIPTION OF THE BEST MODE FOR CARRYING OUT THE INVENTION

Figure 1:
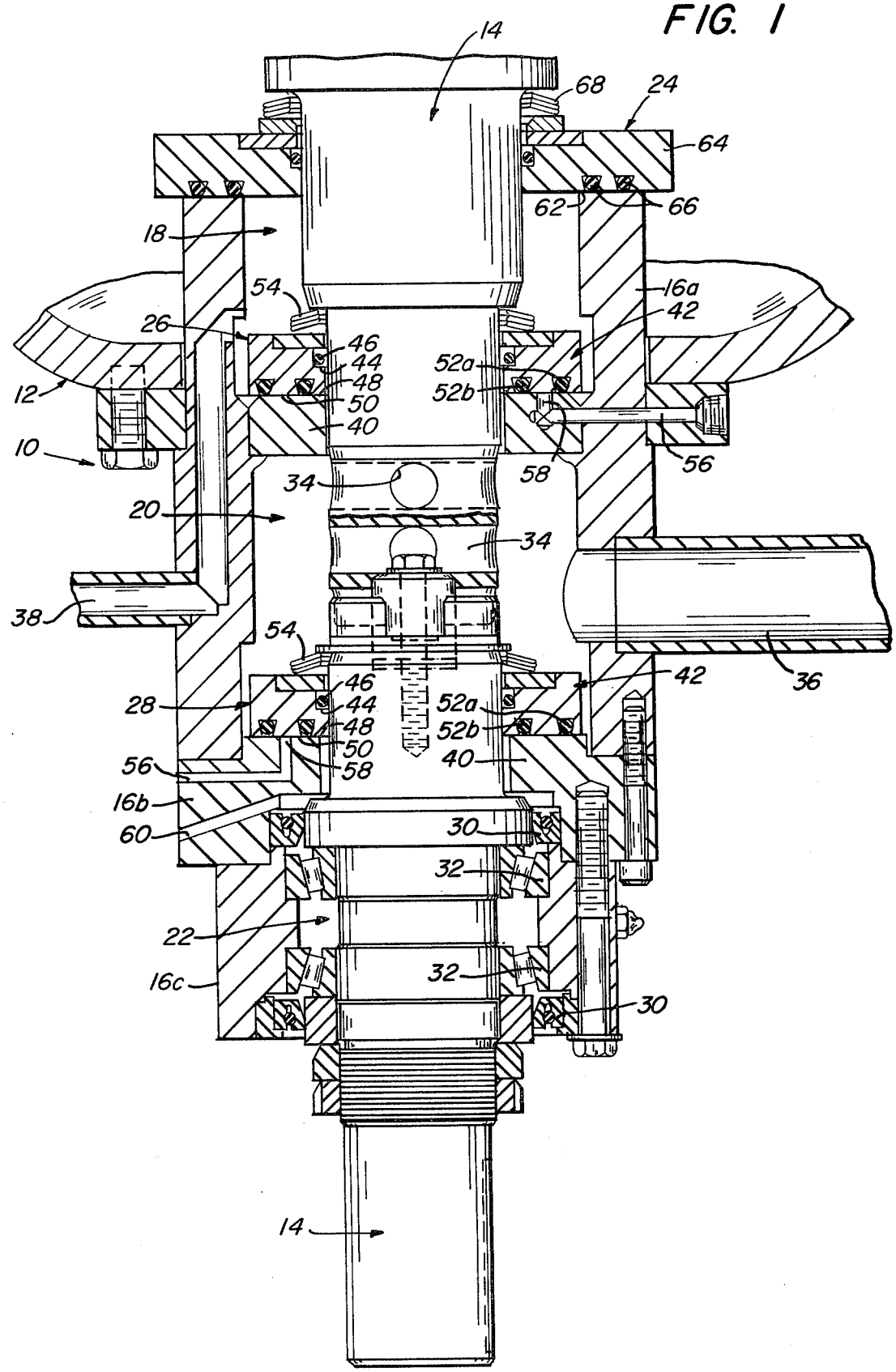
FIG. 1 is an axial cross-sectional view of a seal assembly constructed in accordance with the principles of the present invention.

In FIG. 1, there is shown a lower bearing and sump assembly 10 for a centrifugal filter having horizontal filter elements supported upon a vertical rotatable shaft as disclosed, for example, in U.S. Pat. No. 3,662,894. The sump assembly 10 is adapted to collect filtrate from the filter vessel 12 (shown only partially in FIG. 1) and to support the lower end segment of the main shaft 14 for rotation about a vertical axis.

The sump assembly 10 includes a stationary cylindrical sleeve 16 removably mounted on the bottom of the vessel 12 and extending outwardly therefrom in coaxial relation to the lower end of the shaft 14. Within the sleeve 16 there is defined a scavenger chamber 18 in communication with the vessel 12, a filtrate collection chamber 20 below the scavenger chamber 18, and a lowermost bearing chamber 22. The main shaft 14 is sealed to the sleeve 16 at axially spaced locations therealong; a vessel seal assembly 24 seals the vessel from the scavenger chamber 18, a scavenger seal assembly 26 seals the scavenger chamber 18 from the filtrate collection chamber 20, and a bearing seal assembly 28 seals the collection chamber 20 from the bearing chamber 22.

In order to facilitate access into the assembly 10, it may be desirable to sectionalize the sleeve 16. Thus, as shown in FIG. 1, the sleeve 16 comprises a main section 16a defining the chambers 18 and 20, an intermediate section 16b forming the lowermost portion of the filtrate chamber 20, and a lower section 16c defining the bearing chamber 22. The sleeve sections 16a, 16b, and 16c are assembled with bolts to permit disassembly as desired.

A pair of conventional lip seals 30 are provided at opposite ends of the bearing chamber 22 to preclude dirt or other contaminates from entering the chamber. An opposed pair of tapered roller bearings 32 are disposed within the chamber 22 intermediate the lip seals 30 and serve to rotatably support the main shaft 14 on the sleeve 16.

As explained in the aforementioned U.S. Pat. No. 3,662,894, the shaft 14 has an axial passage formed therein which is normally in fluid communication with certain of the horizontal filters supported on the shaft 14 such that filtrate may be removed from the vessel 12. Transverse passages 34 in the shaft 14 provide a flow path for the filtrate from the axial passage in the shaft to the filtrate collection chamber 20 where the filtrate is then drawn off through an outlet 36. Filtrate from the lowermost portion of the vessel 12 is subsequently collected in the scavenger chamber 18 for withdrawal through an outlet 38.

With one exception noted below, the scavenger seal assembly 26 and the bearing seal assembly 28 are substantially identical in construction and, accordingly only one of these will be described in detail. Considering the scavenger seal assembly 26, there is included an inner annular shoulder 40 on the sleeve 16, and a ring 42 coaxially mounted on the shaft 14 for axial movement therealong to and from the shoulder 40. A circumferential groove 44 formed on the I.D. of the ring 42 retains an O-ring 46 to form a slideable, fluid-tight seal between the ring 42 and the shaft 14. An annular surface 48 on the shiftable ring 42 is adapted to seat against a complemental, tankwardly-facing annular surface 50 on the shoulder 40 when the ring 42 is shifted thereagainst.

A concentric pair of O-rings 52a, 52b are carried in appropriately dimensioned grooves formed in the surface 48 for forming a pair of annular, radially offset seals between the surfaces 48, 50 when the ring 42 is seated against the shoulder 40. To this end, a wavy spring washer 54 on the shaft 14 serves to yieldably bias the ring 42 against the shoulder 40. By virtue of the seals formed by the O-rings 46, 52a, and 52b, it will be appreciated that no fluid flow can occur along the outside of the shaft between the scavenger chamber 18 and the filtrate collection chamber 20.

The scavenger seal assembly 26 also includes an inlet 56 extending through the sleeve 16 and adapted to be coupled to a source of fluid under pressure (not shown). The inlet 56 has an inner port 58 opening in the annular surface 50 intermediate the seals formed by the O-rings 52a, 52b. It is to be understood that when the inlet 56 is placed in flow communication with the source of fluid under pressure, the resulting force against the ring 42 at the port 58 will be sufficient to shift the ring axially against the biasing of the spring washer 54 to thereby open the seals formed by the O-rings 52a, 52b. As will be explained hereinbelow, shifting of these seals to an open mode is desirable when shaft 14 must be rotated.

In a like manner, the bearing seal assembly 28 serves to preclude fluid flow along the shaft 14 between the filtrate collection chamber 20 and the bearing chamber 22. The inlet 56 of the seal assembly 28 likewise may be selectively coupled with the source of fluid under pressure to open the seals formed by the O-rings 52 when it is desired to rotate the shaft 14. However, unlike the scavenger seal assembly 26, the bearing seal assembly 28 includes a vent 60 extending through the sleeve 16 downstream from the seal between the surfaces 48, 50 formed by the O-ring 52b. The vent 60 serves to preclude an undesired pressure buildup against the lip seal 30 during times when the bearing seal assembly 28 is in the open mode for rotation of the shaft 14. Additionally, the vent 60 may serve as an indicator to detect leaks through the primary seals formed by the O-rings 52.

The vessel seal assembly 24 is similar in construction to the seal assemblies 26, 28 but forms its seals on the end surface 62 of the sleeve 16 rather than engaging a shoulder formed thereon. A shiftable ring 64 carries a pair of coaxially disposed resilient O-rings 66 for movement to and from the end surface 62, and is biased to a seated position thereagainst by a spring washer 68. An inlet (not shown), corresponding to the inlet 56 of assemblies 24 and 28, is adapted to be coupled to a source of fluid under pressure and has an inner port in the surface 62 intermediate the seals formed by the O-rings 66.

Considering now FIG. 2, there is shown an alternate embodiment of the seal assembly of the present invention for use in applications where corrosive or highly abrasive materials are encountered. A seal assembly 72 corresponds to the scavenger seal assembly 26 in that it includes a shiftable ring 74 adapted for reciprocal movement axially along a shaft (not shown) to and from seating engaging with a stationay shoulder 76 analogous to the annular shoulder 40 of the seal assembly 26. Like the previously described seal assemblies, the shoulder 76 presents an annular seal surface 78 adapted to form a pair of annular, radially spaced seals with the ring 74 when the latter is biased against the shoulder 76. However, the seal assembly 72 employs a polytetrafluoroethylene spring-loaded sealing member 80 to effect the seals rather than the resilient O-rings of the previously described embodiment.

The sealing member 80 is annular but presents a T-shaped cross section with each branch of the cross section having a U-shaped channel into which is fitted a complemental metal spring 82. Each branch of the cross section of the sealing member 80 resembles the sealing rings commercially available from Aeroquip Corporation under the trademark "OMNISEAL". As shown in the drawing, the opposed branches each serve to form a seal between the surface 78 and the ring 74, while the intermediate branch is complementally received within a dove-shaped channel 84 in the ring 74 for securing the sealing member thereto.

In order to avoid damage to the sealing member 80, there is provided a stop 86 between the ring 74 and the shoulder 76. Though not shown, it is to be understood that the seal assembly 72 includes an inlet analogous to the inlet 56 of the scavenger seal assembly 26 to permit the seals formed by the member 80 to be opened when it is desired to rotate the shaft upon which the ring 74 is mounted. This inlet, of course, has an inner port (not shown) which opens on the surface 78 intermediate the radially spaced seals formed by the opposed branches of the sealing member 80.

INDUSTRIAL APPLICABILITY

Though the seal assembly of the present invention has been described, for the purpose of explanation, mounted in the sump of a centrifugal filter of the type having a vertical rotatable shaft, it will be appreciated that the principles of this invention may be used advantageously in virtually any application where it is desired to employ static seals for an intermittently rotatable shaft. The open mode capability for the static seals of the present invention greatly reduces seal wear and as a result, significantly lessens downtime and maintenance expenses.

The unique radially offset seals disclosed in this invention permit the provision of open mode operation with an appreciably reduced number of parts than has heretofore been available. Accordingly, savings may be realized not only in initial cost but also in maintenance and service. Along this line, the reduced number of parts in the present invention also greatly simplifies assembly and disassembly of the seals.

The unique vent provided in the bearing seal assembly 28 reduces the likelihood that contaminates will be introduced into the bearing during flushing operations. Moreover, as previously described, the vent also serves as a detector should a leak occur across the primary seals of the bearing seal assembly.

I claim:

1. In a liquid processing device having a liquid-receiving vessel and an intermittently rotatable shaft in the vessel projecting outwardly therefrom, an improved seal assembly between the shaft and vessel comprising:

a stationary sleeve extending outwardly from said vessel concentric with said shaft;

an inner circumferential shoulder on said sleeve presenting an annular surface transverse to the longitudinal axis of said shaft;

a ring on said shaft in sealed engagement therewith said ring being slidable axially of the shaft along a reciprocal path of travel to and from said annular surface on said shoulder;

means yieldably biasing said ring to a position seated against said shoulder;

seals means on said ring for forming a pair of annular, radially spaced, releasable seals between said surface and said ring when the latter is seated against said shoulder by said biasing means;

a fluid inlet extending through said sleeve, and having an inner port on said surface;

said inlet being adapted to be selectively coupled to a source of fluid under pressure to unseat said ring from said shoulder against the influence of said biasing means, whereby said seals may be opened as desired to reduce seal wear during rotation of said shaft; and said inner port being disposed intermediate said seals such that said shaft is isolated from said pressurized fluid until said ring is unseated from said shoulder.

2. The invention of claim 1, said annular surface being in a plane perpendicular to the longitudinal axis of said shaft.

3. The invention of claim 1, said seal means comprising a pair of concentric, radially offset, resilient O-rings.

4. The invention of claim 1, and a sealed bearing between said shaft and said sleeve, said seal assembly including a vent in said sleeve intermediate said shoulder and said bearing; whereby to relieve the pressure on the bearing occurring when said seals are opened.

5. The invention of claim 1, said seal means comprising a pair of continuous, polytetrafluoroethylene, spring-loaded sealing rings.

* * * * *